US008732399B2

(12) United States Patent
Jahagirdar et al.

(10) Patent No.: US 8,732,399 B2
(45) Date of Patent: *May 20, 2014

(54) TECHNIQUE FOR PRESERVING CACHED INFORMATION DURING A LOW POWER MODE

(71) Applicant: Intel Corporation, Santa Clara, CA (US)

(72) Inventors: Sanjeev Jahagirdar, Folsom, CA (US); Varghese George, Folsom, CA (US); Jose P. Allarey, Davis, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/787,311

(22) Filed: Mar. 6, 2013

(65) Prior Publication Data

US 2013/0179639 A1    Jul. 11, 2013

Related U.S. Application Data

(63) Continuation of application No. 11/880,357, filed on Jul. 20, 2007, now Pat. No. 8,527,709.

(51) Int. Cl.
G06F 12/00 (2006.01)
G06F 13/00 (2006.01)
G06F 13/28 (2006.01)

(52) U.S. Cl.
USPC .................................. 711/130; 711/E12.052

(58) Field of Classification Search
USPC ................... 711/122, 130, E12.052
See application file for complete search history.

(56) References Cited

U.S. PATENT DOCUMENTS

| 5,247,649 | A | 9/1993 | Bandoh |
| 5,632,038 | A | 5/1997 | Fuller |
| 6,052,789 | A | 4/2000 | Lin |
| 6,804,632 | B2 | 10/2004 | Orenstien |
| 6,971,034 | B2 | 11/2005 | Samson et al. |
| 6,976,181 | B2 | 12/2005 | Dai et al. |
| 7,461,213 | B2 * | 12/2008 | Hass et al. ............. 711/147 |
| 2003/0097530 | A1 | 5/2003 | Arimilli et al. |

(Continued)

FOREIGN PATENT DOCUMENTS

| CN | 1910538 A | 2/2007 |
| WO | 2009/014931 A2 | 1/2009 |
| WO | 2009/014931 A3 | 4/2009 |

OTHER PUBLICATIONS

Great Britain Intellectual Property Office, UK Search and Examination Report mailed Apr. 3, 2012 in UK Patent Application No. 1000648.4.

(Continued)

Primary Examiner — Sheng-Jen Tsai
(74) Attorney, Agent, or Firm — Trop, Pruner & Hu, P.C.

(57) ABSTRACT

A technique to retain cached information during a low power mode, according to at least one embodiment. In one embodiment, information stored in a processor's local cache is saved to a shared cache before the processor is placed into a low power mode, such that other processors may access information from the shared cache instead of causing the low power mode processor to return from the low power mode to service an access to its local cache.

20 Claims, 4 Drawing Sheets

(56) References Cited

U.S. PATENT DOCUMENTS

| | | |
|---|---|---|
| 2003/0101362 A1 | 5/2003 | Dia |
| 2004/0039880 A1 | 2/2004 | Pentkovski |
| 2005/0005073 A1 | 1/2005 | Pruvost |
| 2006/0095806 A1 | 5/2006 | Dai |
| 2006/0171244 A1 | 8/2006 | Ando |
| 2006/0179250 A1 | 8/2006 | Guthrie et al. |
| 2007/0005900 A1 | 1/2007 | Horrigan |
| 2007/0150663 A1 | 6/2007 | Mendelson et al. |
| 2007/0156963 A1 | 7/2007 | Chen |
| 2007/0156992 A1 | 7/2007 | Jahagirdar |
| 2008/0082753 A1 | 4/2008 | Licht |
| 2008/0209133 A1 | 8/2008 | Ozer |
| 2009/0024799 A1 | 1/2009 | Jahagirdar et al. |
| 2009/0132764 A1 | 5/2009 | Moll |

OTHER PUBLICATIONS

International Search Report and Written Opinion received for PCT Patent Application No. PCT/US2008/069962, mailed on Feb. 10, 2009, 11 pages.

International Preliminary Report on Patentability received for PCT Patent Application No. PCT/US2008/069962, mailed on Feb. 4, 2010, 6 pages.

Office Action received for Chinese Patent Application No. 200810137747.6, mailed on Jan. 12, 2011, 25 pages of Chinese Office Action including 15 pages of English Translation.

Office Action received for Chinese Patent Application No. 200810137747.6, mailed on Feb. 5, 2010, 19 pages of Chinese Office Action including 10 pages of English Translation.

Office Action received for Korean Patent Application No. 2010-7001251, mailed on Apr. 18, 2011, 3 pages of English Translation.

Office Action received for Chinese Patent Application No. 200810137747.6, mailed on Jun. 29, 2011, 9 pages of Chinese Office Action including 4 pages of English Translation.

Office Action received for United Kingdom Patent Application No. GB1000648.4, mailed on Jul. 1, 2011, 6 pages.

Office Action received for Taiwan Patent Application No. 097124713, mailed on Aug. 11, 2011, 17 pages of Taiwan Office Action including 9 pages of English Translation.

* cited by examiner

TECHNIQUE FOR PRESERVING CACHED INFORMATION DURING A LOW POWER MODE

This application is a continuation of U.S. patent application Ser. No. 11/880,357, filed Jul. 20, 2007, now U.S. Pat. No. 8,527,709, issued Sep. 3, 2013, the content of which is hereby incorporated by reference.

TECHNICAL FIELD

Embodiments of the invention relate generally to the field of information processing and more specifically, to the field of power management in computing systems and microprocessors.

BACKGROUND

Some microprocessors and/or processor cores (referred to generically herein as "processors") may include or otherwise have access to a primary cache memory, such as a level one ("L1") cache, or other memory structure from which the processor may retrieve frequently accessed information, such as data or instructions, relatively quickly in relation to other memory structures in the processor or computing system. In addition, some processors may include or otherwise have access to a secondary cache memory, such as a level two ("L2") cache memory, or other memory structure from which it may retrieve less frequently accessed information, such as data or instructions, less quickly than from a primary cache memory but faster than from a system memory, such as dynamic random access memory (DRAM), hard-drive memory, etc.

Some computer systems may include processors, each including or otherwise having access to a local cache memory, such as an L1 cache, to store information that is to be primarily used by the processor to which it corresponds. Furthermore, some computer systems may include a shared cache memory, such as an L2 cache, that may be used by more than one processor. In computer systems having shared cache memory, the shared cache memory may store all or some portion of information stored in each of the local cache memories, such that multiple local cache memories store a subset of frequently used information stored in the shared cache memory. Information stored in local cache memories may be updated more frequently than the corresponding information in the shared cache memory, and therefore, the computer system may implement a cache coherency scheme to maintain the same information in the shared cache memory as is stored in one or more local cache memories.

Some computer systems may use power management techniques to place processors in the system in low power modes, via reducing clock frequency and/or voltage to one or more processors in the system, when a particular processor isn't being used or in response to other algorithms, such as those in which temperature of the processor or computer system is monitored and prevented from exceeding a threshold temperature. Processors that are placed in low power modes may retain information stored in their corresponding local cache memory while in the low power mode by, for example, maintaining power to the local cache, such that the information will be available when the processor returns from the low power mode.

One drawback of prior art techniques of retaining cached information during a low power mode is that processors that may access a cache of a processor in a low power mode, via a "snoop" cycle, for example, may have to wait until the processor in the low power mode returns from the low power mode and can respond to the access by the other processor. The latency between the access to the low power mode processor's cache and when the requested data is either retrieved or determined not to exist in the low power mode processor's cache can significantly diminish the performance of the corresponding computer system. The problem may be exacerbated when the number of processors are increased, as the number of processors that may be in a low power mode and the number of accesses to these processors may increase. Furthermore, the computer system may draw unnecessary power, particularly if the requested information is determined not to exist in the local cache of the processor that's in a low power mode.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION

Figure 1:
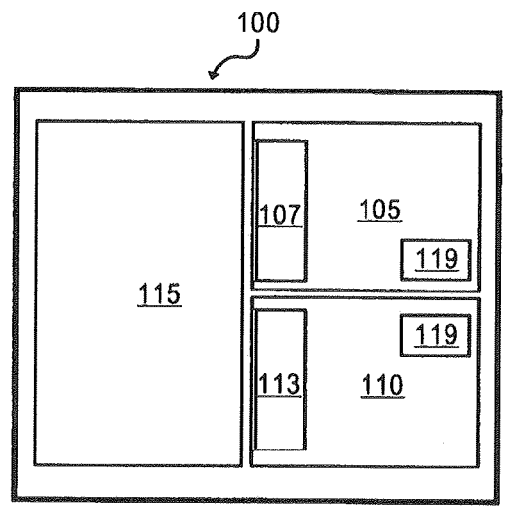
FIG. 1 illustrates a block diagram of a multi-core microprocessor, in which at least one embodiment of the invention may be used.

At least one technique for retaining cached information during a low power mode within a computer system is disclosed. In the following description, for purposes of explanation, numerous specific details are set forth in order to provide a thorough understanding of embodiments of the present invention. It will be apparent, however, to one skilled in the art that embodiments of the present invention can be practiced without these specific details.

In general, embodiments described herein may be applied to any number of multi-processor systems that include multiple microprocessors, a single microprocessor having multiple processor cores, or multiple processors each having multiple processor cores. For simplicity, microprocessors and microprocessor cores will be generically referred to herein as "processors". Furthermore, primary caches (i.e., those used to store most frequently used information by a processor) will be referred to generically herein as "local caches", whereas secondary caches (i.e., those used to store less frequently used information than a local cache, such as L2 caches, L3 caches, etc.) that are used to store at least some information stored in the primary caches of two or more processors shall be referred to generically herein as "shared caches". Finally, voltage and/or frequency states, in which a processor may operate, including those in which one or more processor clocks are idle, stopped, halted, or reduced below a maximum operating frequency and/or one or more processor voltages are reduced below a maximum operating voltage, may be generically referred to herein as "power modes".

In some embodiments, a processor may save information stored in its local cache to corresponding locations within a shared cache before being placed into a low power mode, such that other processors, which may otherwise attempt to access information from the low power mode processor's local cache may instead retrieve the required information from the shared cache, and the low power mode processor may remain in a low power mode until it's otherwise needed. Advantageously, at least one embodiment may improve performance in a computer system, because instead of the system waiting for a processor in a low power state to return from the low power state to service an access to its local cache by another processor, the information may instead be retrieved from the shared cache to which the low power mode processor saved the information before entering the low power state. In some embodiments, an access to the shared cache may be serviced faster than an access to a local cache of a processor in a low power mode. Furthermore, because a processor in a low power mode may not need to return from the low power mode to service an access to its local cache, at least one embodiment may help conserve power in a system in which the at least one embodiment is used.

In one embodiment, a processor to be placed in a low power mode may first perform a cache flush operation, cache invalidate operation, writeback operation or other operation that causes the information stored in the processor's local cache to be saved to a shared cache. In one embodiment, the low power mode may include turning off one or more clocks to the processor to be placed in the low power mode. In other embodiments, the low power mode may include reducing or removing one or more operating voltages used to power the processor, the local cache, or both. In still other embodiments, a low power mode may reduce or completely disable both frequency and voltage to a processor.

FIG. 1 illustrates a multi-core microprocessor in which at least one embodiment of the invention may be used. In particular, FIG. 1 illustrates microprocessor 100 having at least two processor cores 105 and 110, each having associated therewith a local cache 107 and 113, respectively. Also illustrated in FIG. 1 is a shared cache memory 115 which may store versions of at least some of the information stored in each of the local caches 107 and 113. In some embodiments, microprocessor 100 may also include other logic not shown in FIG. 1, such as an integrated memory controller, integrated graphics controller, as well as other logic to perform other functions within a computer system, such as I/O control. In one embodiment, each microprocessor in a multi-processor system or each processor core in a multi-core processor may include or otherwise be associated with logic 119 to direct an access to either a local cache or a shared cache, depending upon the power state of the processor/core at any given time. The logic may include or be associated with a memory, such as a non-volatile programmable memory, to store the power state of the core or processor at any time during the operation of the computer system. In such an embodiment, accesses to a processor or core are made without regard to the power state of the target processor or core, such that the same type of access, such as a snoop, may be sent to each processor or core and the target processor or core may either service the snoop to its local cache or redirect the snoop into an access (snoop or other operation) to the shared cache, depending on the power state of the processor or core.

In one embodiment, one of the processor cores illustrated in FIG. 1 may store a most recent version of information stored in its local cache to the shared cache before entering a low power mode. When one of the cores is in a low power mode ("the low power mode core"), the other core (or cores) may obtain the most recent version of information stored in the low power mode core's local cache by accessing the shared cache, since the low power mode core had saved the most recent information from its local cache to the shared cache before it went into the low power mode. In one embodiment, the low power mode core may have performed a cache flush operation, in which some or all of the information stored in the low power mode core's local cache is saved to the shared cache before some or all of the local cached information is invalidated or the low power mode core enters the low power mode. In other embodiments, other operations may be performed to save some or all of the information of the low power mode core's local cache to the shared cache, depending on the instruction set architecture of the core.

In one embodiment, a processor may, at anytime, be in one of a number of different power states, including one or more low power modes. For example, a processor may be in a fully powered component state ("C0"), in which a maximum allowable amount of power is consumed, a reduced power component state ("C1"), defined by a lower allowable power consumption than the C0 state, or other low power states (e.g., C3, C6, etc.), each being defined by progressively lower allowable power consumption. Moreover, one or more of a processor's clocks or power supplies may be adjusted to accomplish the allowable power consumption associated with each state.

For example, in one embodiment, a fully powered C0 state may be achieved by operating one or more processor clocks within a range of frequencies and operating one or more power supplies to the processor within a range of voltages so as to maximize performance of the processor. Such a power state may be useful, for example, when a large performance demand is placed on the processor by a program running on the processor. A reduced power state, C1, may be accomplished by putting the processor into an idle, halt, or other low performance state by stopping or reducing one or more processor clocks while maintaining one or more power supplies to the processor within a range of voltages. In such a reduced power state, the processor may be able to draw less power than in the C0 state, but yet still service accesses to its local cache from other processors, vis-a-vis a snoop operation, for example.

In one embodiment, a processor, such as one of the cores illustrated in FIG. 1, may be placed into a lower power state than C0 or C1 by stopping or reducing one or more clocks to the processor and removing or reducing the voltage of one or more power supplies supplied to the processor, such that information stored in the processor's local cache would not be retained. In FIG. 1, for example, one of the cores may be placed into a low power core component state ("CC3" state), in which all clocks to the core are halted and all power supply voltages are removed or otherwise lowered to a non-active level. In a CC3 state, according to one embodiment, a core may draw a minimal amount of power, and possibly none at all. Therefore, before a processor, or a core illustrated in FIG. 1, can be placed into a CC3 state, at least any modified information stored in the core's local cache may be stored to the corresponding location in the shared cache. In one embodiment, only modified information (i.e., versions of information in the local cache that are more recent than versions of the same information stored in the shared cache) is stored to the shared cache before the core enters the CC3 state. In other embodiments, the entire contents of the local cache is stored to the shared cache before the core enters the CC3 state, regardless of whether it has been modified from the versions available in the shared cache.

Advantageously, because the shared cache contains at least the modified information stored in the local cache of the core to be placed in a CC3 state, in one embodiment, any other processors, or cores illustrated in FIG. 1, that may otherwise attempt to access the CC3 core's cache, such as when the core to be accessed is in a reduced core component state (e.g., "CC1"), may instead access the requested information directly from the shared cache, leaving the CC3 core in a low power mode, thereby saving power. Furthermore, in one embodiment, since the CC3 core does not have return from its low power state to service an access to its local cache from another core or processor, vis-a-vis a snoop operation, for example, the accessing processor or core may not have to wait as long for the information it requests as it would if it had to wait for the accessed core to return from its low power state to service the request. The techniques described above in various embodiments may be further applied to a system having any number of processors or processor cores.

Figure 2:
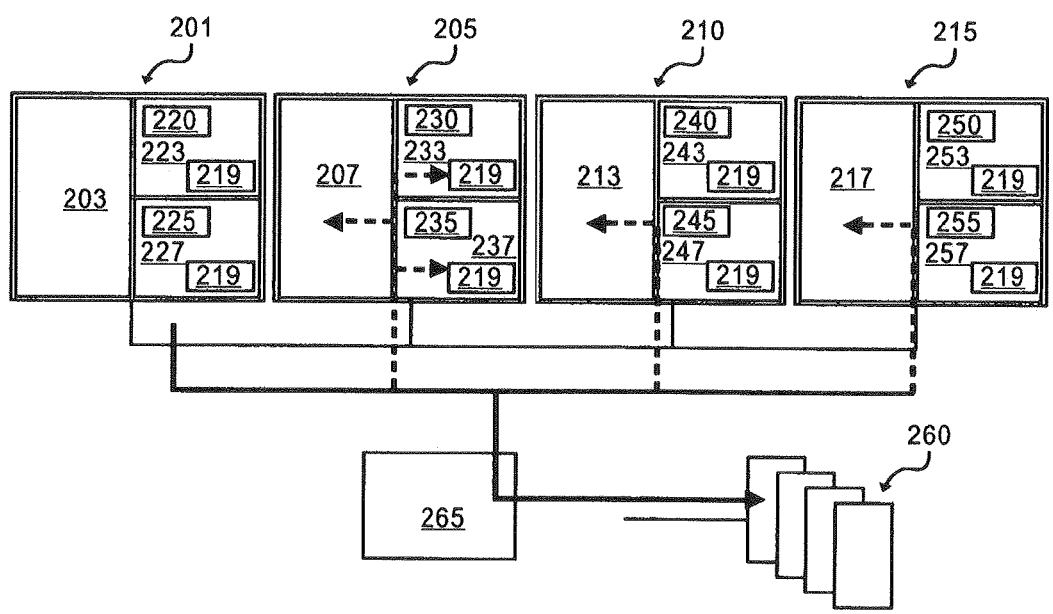
FIG. 2 illustrates a block diagram of a shared bus computer system, in which at least one embodiment of the invention may be used.

FIG. 2, for example, illustrates a front-side-bus (FSB) computer system in which one embodiment of the invention may be used. Any processor 201, 205, 210, or 215 may access information from any local level one (L1) cache memory 220, 225, 230, 235, 240, 245, 250, 255 within or otherwise associated with one of the processor cores 223, 227, 233, 237, 243, 247, 253, 257. Furthermore, any processor 201, 205, 210, or 215 may access information from any one of the shared level two (L2) caches 203, 207, 213, 217 or from system memory 260 via chipset 265. One or more of the processors in FIG. 2 may include or otherwise be associated with logic 219 to direct an access to either a local cache or a shared cache, depending upon the power state of the processor/core at any given time. The logic may include or be associated with a memory, such as a non-volatile programmable memory, to store the power state of the core or processor at any time during the operation of the computer system.

In the example illustrated in FIG. 2, both cores are in an active core component state ("CC0" state) in processor 201, whereas in processor 205, both cores are in a reduced power state, such as CC1, such that each core can service snoops, or similar operations, from active cores 223 and 227. Processors 210 and 215 each have their cores in a lower power mode than the cores of processors 201 and 205, such as a CC3 state, such that the information in local caches 243, 247, 253, and 257 are no longer available. In one embodiment, if active cores 223 or 227 are to access information that was stored in the local caches of the cores of processors 210 and 215, then they will have to obtain the information from the shared caches of processors 210 and 215, respectively. This is because, in one embodiment, the cores of processors 223 and 227 stored at least modified versions of the information stored in their local caches to their respective shared caches 213 and 217 before entering the CC3 state. If the information requested from the cores of processor 201 is not available in the shared caches 213 and 217, nor available in the local caches 230 or 235, then the cores of processor 201 will have to resort to accessing the information from system memory 260 via chipset 265 or via a hard drive or other memory source not shown in FIG. 2.

In some embodiments, the cores of each of the processors of FIG. 2 may be in different power modes from one another rather than in the same power mode as illustrated in FIG. 2. In one embodiment, logic may be included in each of the processors or cores to indicate to a snoop or similar operation whether the core being accessed is in a CC3 state or other state, such that the requesting core may issue the appropriate transaction to address the appropriate memory structure (local cache or shared cache) of the core being accessed. In some embodiments, an indication of core power state may be recorded and tracked in a software program, such as a table accessible by a computer system's BIOS. For example, in one embodiment, whenever a core or processor changes power state, the change is recorded in table stored in logic or memory that a system BIOS can read and inform any cores or processors that may attempt to access another processor's or core's local cache. By informing the accessing processor or core about the power modes of other processors or cores, it can access the appropriate memory structure, such as a shared cache when the corresponding local cache to be accessed is in a reduced power state, such as CC3. In other embodiments, power mode information for each processor or core may be modified and recorded through other means, including hardware logic or other software besides BIOS.

In some embodiments, a processor or core being accessed may include logic to control the accessed processor's/core's response. For example, in one embodiment, each processor (or core) in a computer system that is to use techniques described herein, may include storage, such as a non-volatile programmable memory, that stores the power state of the processor at any given time such that associated logic may determine how to respond to a snoop request, or other similar operation, from another processor/core. In one embodiment, the storage and logic may be used, for example, to cause an access to a processor or core in a CC3 state to be redirected from the processor's or core's local cache to a shared cache or other L2 cache. Whereas if the processor or core being accessed was in another state, such as a CC0 or CC1 state (i.e., a higher power state than CC3), then logic within the accessed processor or core would allow its local cache to be snooped or otherwise accessed. In such an embodiment, the accessing processor core need not be aware of any processor's power state, but may simply issue an access, such as a snoop, to the local cache of any other processor and the accessed processor (or core) may direct the access where it needs to go based on the power state its in at the time.

Figure 3:
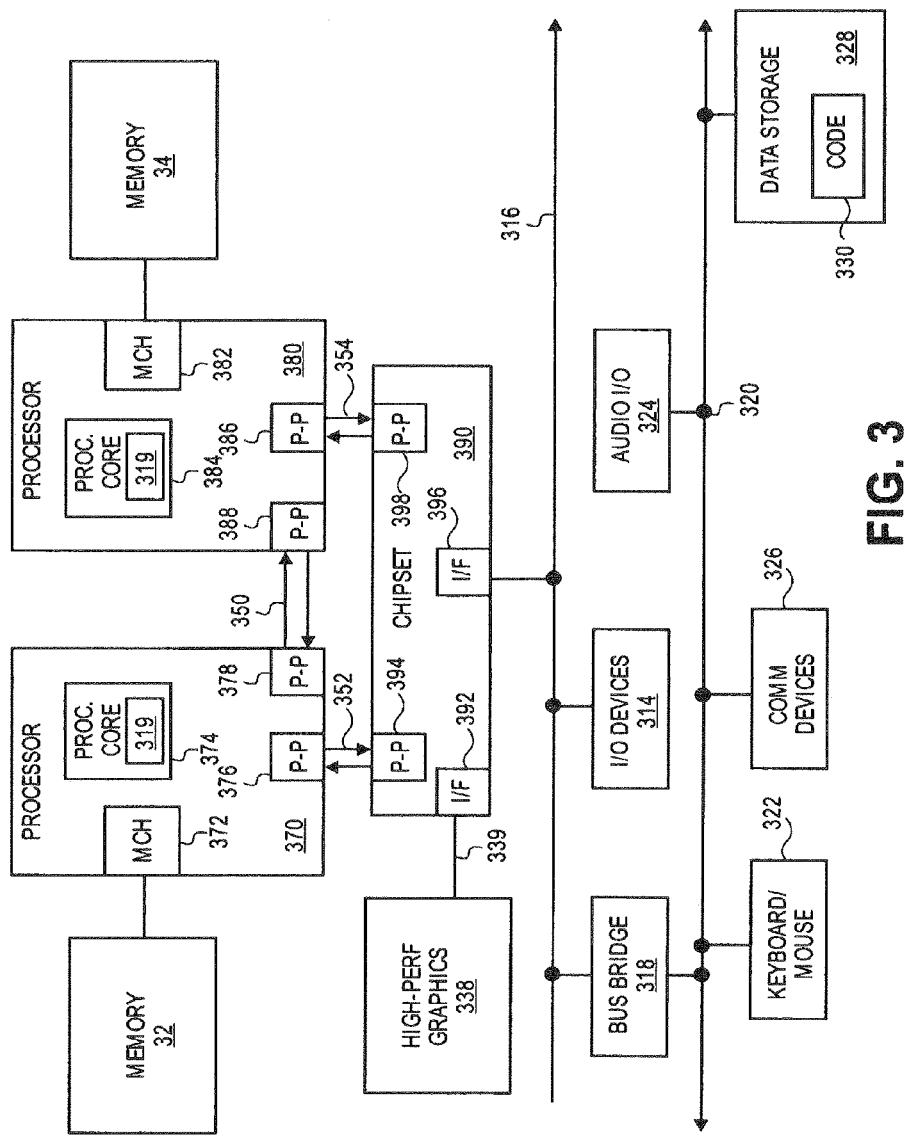
FIG. 3 illustrates a block diagram a point-to-point interconnect computer system, in which at least one embodiment of the invention may be used.

In addition to the FSB computer system illustrated in FIG. 2, other system configurations may be used in conjunction with various embodiments of the invention, including point-to-point (P2P) interconnect systems and ring interconnect systems. The P2P system of FIG. 3, for example, may include several processors, of which only two, processors 370, 380 are shown by example. Processors 370, 380 may each include a local memory controller hub (MCH) 372, 382 to connect with memory 32, 34. Processors 370, 380 may exchange data via a point-to-point (PtP) interface 350 using PtP interface circuits 378, 388. Processors 370, 380 may each exchange data with a chipset 390 via individual PtP interfaces 352, 354 using point to point interface circuits 376, 394, 386, 398. Chipset 390 may also exchange data with a high-performance graphics circuit 338 via a high-performance graphics interface 339. Embodiments of the invention may be located within any processor having any number of processing cores, or within each of the PtP bus agents of FIG. 3. In one embodiment, any processor core may include or otherwise be associated with a local cache memory (not shown). Furthermore, a shared cache (not shown) may be included in either processor outside of both processors, yet connected with the processors via p2p interconnect, such that either or both processors' local cache information may be stored in the shared cache if a processor is placed into a low power mode. One or more of the processors or cores in FIG. 3 may include or otherwise be associated with logic 319 to direct an access to either a local cache or a shared cache, depending upon the power state of the processor/core at any given time. The logic may include or be associated with a memory, such as a non-volatile programmable memory, to store the power state of the core or processor at any time during the operation of the computer system.

Figure 4:
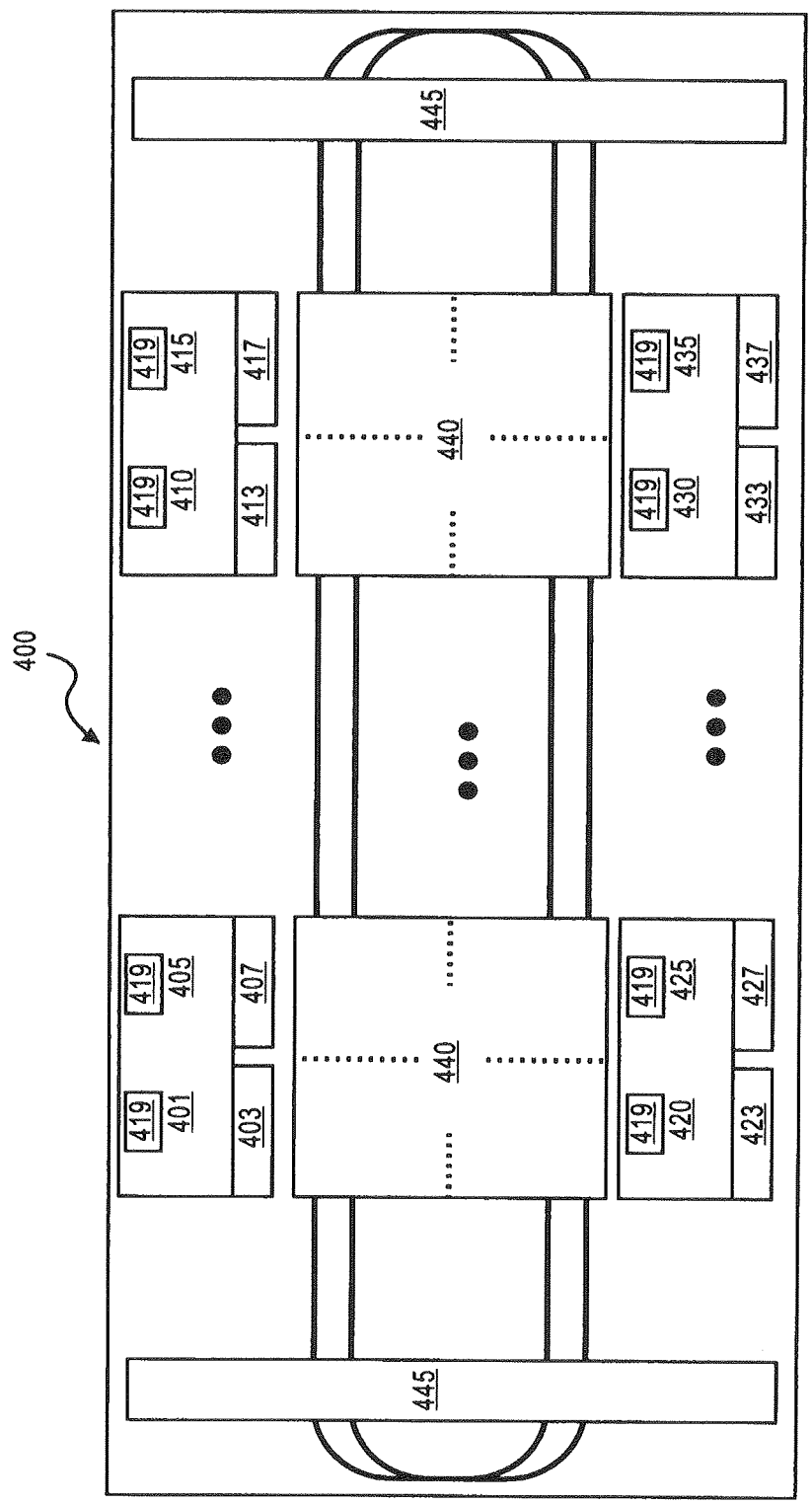
FIG. 4 illustrates a block diagram of a ring-based multi-core microprocessor, in which at least one embodiment of the invention may be used.

FIG. 4 illustrates a computer system or processor organized in ring configuration, in which at least one embodiment may be used. The ring system of FIG. 1 includes eight processors or processor cores 401, 405, 410, 415, 420, 425, 430, 435 organized along a concentric ring interconnect, in which each processor or core has a corresponding local cache which may be accessed by another core along the ring interconnect. The system or processor of FIG. 4 also includes a shared last level cache (LLC) 440, which stores all or some versions of information stored in the local caches 403, 407, 413, 417, 423, 427, 433, 437. In one embodiment if one of the processors or cores in FIG. 4 are in a power mode, in which information is no longer accessible from the processor's or core's local cache, then any other processor or core attempting to access information that was stored in the low power mode processor's/core's local cache, must instead attempt to access this information from the LLC. In one embodiment, if the information is not available in the LLC, then the accessing processor or core may need to access the data from a system memory source (not shown) via memory controller 445. One or more of the processors in FIG. 4 may include or otherwise be associated with logic 419 to direct an access to either a local cache or a shared cache, depending upon the power state of the processor/core at any given time. The logic may include or be associated with a memory, such as a non-volatile programmable memory, to store the power state of the core or processor at any time during the operation of the computer system.

Figure 5:
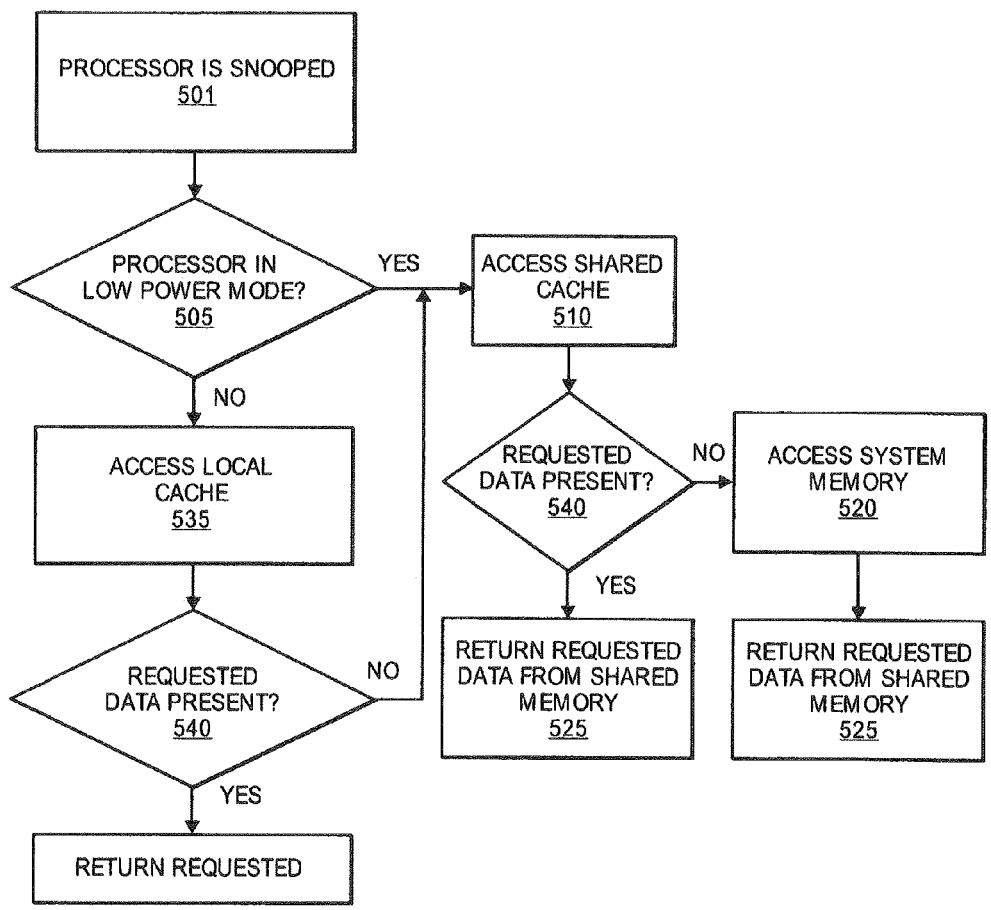
FIG. 5 is a flow diagram of operations that may be used for retaining cached information during a low power mode, according to one embodiment of the invention.

FIG. 5 illustrates a flow diagram of operations that may be used in conjunction with at least one embodiment of the invention, regardless of the processor or system configuration in which the embodiment is used. At operation 501, for example, an access is made to a processor, such as through a snoop operation or other cache access operation. If the accessed processor is in a low power mode, such as a CC3 state, at operation 505, then the processor's shared cache is accessed at operation 510. The access may be a snoop to the shared cache or the snoop may be converted into an another operation to access the shared cache, depending on the protocol used. If the requested information is not present in the shared cache, at operation 515, then an access is made to system memory at operation 520 and the information is returned from the system memory at operation 530, otherwise the information is returned from the shared cache at operation 525.

If the processor was not in a low power mode, such as CC3, at operation 505, then the local cache of the processor is accessed at operation 535. If the information is available in the local cache, at operation 540, then the information is returned from the local cache at operation 545. Otherwise, the process returns to operation 510 to access the information from either the shared cache or system memory as described above. In one embodiment, an accessing processor sends a snoop to other processors in the system regardless of the power state they are in and the accessed processor determines whether to send the access to a local cache or shared cache, based on the power state of the accessed processor. For example, if the accessed processor is in a CC3 state when accessed, a snoop operation from another processor would be redirected to the accessed processor's shared cache either as a snoop or another operation. Otherwise, the snoop operation may result in an access to the accessed processor's local cache if the accessed processor is in a power state that would allow the local cache to be snooped. In other embodiments, a table is maintained, such as through BIOS, that an accessing processor may referrence prior to accessing another processor in order to determine whether the local cache of that processor should be accessed or its shared cache should be accessed, based on the power state indicated in the table. In other embodiments, other techniques for managing where an access should be directed based on the power state of an accessed processor may be used.

Embodiments described herein may be implemented in a number of ways using a number of technologies. For example, at least one embodiment is implemented in CMOS logic, whereas other embodiments are implemented in software. Still other embodiments are implemented through a combination of hardware logic and software.

In an embodiment, the software used to facilitate the routine can be embedded onto a machine-readable medium. A machine-readable medium includes any mechanism that provides (i.e., stores and/or transmits) information in a form accessible by a machine (e.g., a computer, network device, personal digital assistant, manufacturing tool, any device with a set of one or more processors, etc.). For example, a machine-readable medium includes recordable/non-recordable media (e.g., read only memory (ROM) including firmware; random access memory (RAM); magnetic disk storage media; optical storage media; flash memory devices; etc.), as well as electrical, optical, acoustical or other form of propagated signals (e.g., carrier waves, infrared signals, digital signals, etc.); etc.

One or more aspects of at least one embodiment may be implemented by representative data stored on a machine-readable medium which represents various logic within the processor, which when read by a machine causes the machine to fabricate logic to perform the techniques described herein. Such representations, known as "IP cores" may be stored on a tangible, machine readable medium ("tape") and supplied to various customers or manufacturing facilities to load into the fabrication machines that actually make the logic or processor.

Thus, a method and apparatus for directing micro-architectural memory region accesses has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system comprising:
    a first processor having at least two processor cores, wherein at least one of the processor cores is to enter a low power mode, in which information stored in a local cache of the at least one processor core is no longer accessible, and a logic to direct an access to the local cache or to a shared cache that is to store versions of information stored in each of the at least two processor cores depending on a power state of the at least one processor core;
    a second processor having at least one processor core to access information from the shared cache if the at least one processor core of the first processor is in the low power mode;
    a system memory to store versions of information stored in the shared cache; and
    a memory controller through which the at least one processor core of the second processor is to access the system memory.

2. The system of claim 1, further comprising a non-volatile memory to store a power state of the at least one processor core of the first processor.

3. The system of claim 2, wherein the at least one processor core of the second processor is to attempt to access the information from the at least one processor core of the first processor regardless of the power state in which the at least one processor core of the first processor is in.

4. The system of claim 3, wherein if the at least one processor core of the first processor has not entered the low power mode, the at least one processor core of the second processor is to snoop the at least one processor core's local cache of the first processor.

5. The system of claim 1, wherein the first and second processors are coupled via a front-side bus.

6. The system of claim 1, wherein the first and second processors are coupled via a point-to-point interconnect.

7. The system of claim 1, wherein the first and second processors are coupled via a ring interconnect.

8. The system of claim 1, wherein the low power mode includes stopping a clock and removing power to the at least one processor core of the first processor.

9. The system of claim 8, wherein a lower latency is incurred to access information from the shared cache than to wait for the at least one processor core of the first processor to return from the low power mode and access its local cache.

10. A non-transitory machine-readable medium having stored thereon a set of instructions, which if executed by a machine causes the machine to perform a method comprising:

causing a first processor to redirect an access to a second processor or a third processor to a cache shared between at least the second processor and the third processor instead of a local cache corresponding to one of the second and third processors in response to determining that at least one of the second and third processors has entered a low power mode, wherein entering the low power mode causes the at least one of the second and third processors to store information from its respective local cache to the shared cache and to gate a clock to the at least one of the second and third processors and to reduce power to the at least one of the second and third processors to substantially zero.

11. The non-transitory machine-readable medium of claim 10, wherein the method further comprises determining whether the at least second and third processors are in the low power mode.

12. The non-transitory machine-readable medium of claim 11, wherein determining includes accessing a storage area containing power state information of the at least second and third processors.

13. The non-transitory machine-readable medium of claim 10, wherein the low power mode is a core component three (CC3) power state.

14. A processor comprising:
    a first core including a first local cache, wherein when the first core is to be placed in a low power mode, modified information stored within the first local cache is to be stored in a shared cache prior to entry into the low power mode;
    a second core coupled to the first core via a ring interconnect and to initiate a snoop to the first core to access information stored within the first local cache; and
    logic of the first core including a storage to store a power state of the first core and to direct the snoop to either the first local cache or to the shared cache based on a power state of the first core, wherein the logic is to direct the snoop to the first local cache when the first core is active and to the shared cache when the first core is in the low power mode.

15. The processor of claim 14, wherein the first core is to indicate if it is to enter the low power mode and to direct the access accordingly.

16. The processor of claim 14, wherein the shared cache is to store at least some information stored within the first local cache and a second local cache associated with the second core.

17. The processor of claim 16, wherein the first local cache includes a level one (L1) cache and the shared cache includes a level two (L2) cache.

18. The processor of claim 14, wherein the low power mode includes reduction of at least one clock of the first core and disabling of power to the first core.

19. The processor of claim 14, wherein the low power mode includes placement of the first core into an idle state and reduction of an operating voltage of the first core to substantially zero.

20. The processor of claim 14, wherein the first local cache is to be flushed as a result of entering the low power state.

* * * * *